US 8,868,427 B2

(12) United States Patent
Rysenga (10) Patent No.: US 8,868,427 B2
(45) Date of Patent: Oct. 21, 2014

(54) SYSTEM AND METHOD FOR UPDATING INFORMATION IN ELECTRONIC CALENDARS

(75) Inventor: Jeffrey P. Rysenga, Berkley, MI (US)

(73) Assignee: General Motors LLC, Detroit, MI (US)

( * ) Notice: Subject to any disclaimer, the term of this patent is extended or adjusted under 35 U.S.C. 154(b) by 340 days.

(21) Appl. No.: 12/797,661

(22) Filed: Jun. 10, 2010

(65) Prior Publication Data
US 2011/0144980 A1 Jun. 16, 2011

Related U.S. Application Data

(63) Continuation-in-part of application No. 12/636,553, filed on Dec. 11, 2009.

(51) Int. Cl.
*G10L 19/00* (2013.01)
*G10L 15/26* (2006.01)
*G06Q 10/10* (2012.01)
*G10L 15/00* (2013.01)
*G10L 13/00* (2006.01)
*G10L 21/00* (2013.01)
*H04M 1/725* (2006.01)
*H04M 1/00* (2006.01)
*H04M 11/00* (2006.01)
*H04M 3/42* (2006.01)
*G08G 1/123* (2006.01)
*G08B 19/00* (2006.01)
*G08B 21/00* (2006.01)

(52) U.S. Cl.
CPC ............ *G10L 15/265* (2013.01); *G06Q 10/109* (2013.01)
USPC ........... 704/275; 704/270; 704/260; 704/201; 704/254; 254/412.1; 254/563; 340/995.27; 340/521; 340/540; 379/88.16; 379/88.18; 379/93.23; 379/201.12; 379/211.02

(58) Field of Classification Search
USPC .......... 704/201, 260, 275, 270, 254; 701/408, 701/35, 532, 31.4; 379/88.16, 88.13, 88.18, 379/201.12, 93.23, 88.11, 88.19, 211.02, 379/201.06; 719/328; 340/995.27, 521, 340/540; 455/412.1, 563; 370/352; 707/3; 709/203
See application file for complete search history.

(56) References Cited

U.S. PATENT DOCUMENTS

| | | | |
|---|---|---|---|
| 5,754,629 A * | 5/1998 | Kunimori et al. | 379/88.13 |
| 6,185,535 B1 * | 2/2001 | Hedin et al. | 704/270 |
| 6,687,339 B2 | 2/2004 | Martin | |
| 7,099,656 B2 * | 8/2006 | Chefalas et al. | 455/412.1 |

(Continued)

OTHER PUBLICATIONS

Yilin Zhao, "Telematics: Safe and Fun Driving", IEEE Intelligent Systems, vol. # 17, Issue # 1, 2002, pp. 10-14.*

(Continued)

*Primary Examiner* — Paras D Shah
*Assistant Examiner* — Neeraj Sharma
(74) *Attorney, Agent, or Firm* — Anthony Luke Simon; Reising Ethington P.C.

(57) ABSTRACT

Systems and methods for updating electronic calendar information. Speech is received from a user at a vehicle telematics unit (VTU), wherein the speech is representative of information related to a particular vehicle trip. The received speech is recorded in the VTU as a voice memo, and data associated with the voice memo is communicated from the VTU to a computer running a calendaring application. The data is associated with a field of the calendaring application, and stored in association with the calendaring application field.

18 Claims, 6 Drawing Sheets

(56) References Cited

U.S. PATENT DOCUMENTS

| | | | |
|---|---|---|---|
| 7,137,126 B1* | 11/2006 | Coffman et al. | 719/328 |
| 7,295,136 B2* | 11/2007 | Wakiyama | 340/995.27 |
| 7,433,457 B2* | 10/2008 | Marwell et al. | 379/218.01 |
| 7,599,690 B2 | 10/2009 | Kamdar et al. | |
| 7,693,720 B2* | 4/2010 | Kennewick et al. | 704/275 |
| 7,864,931 B2* | 1/2011 | Stillman et al. | 379/88.18 |
| 8,027,447 B2* | 9/2011 | Sylvain | 379/201.06 |
| 8,064,586 B2* | 11/2011 | Shaffer et al. | 379/211.02 |
| 8,311,584 B2* | 11/2012 | Douthitt et al. | 455/563 |
| 8,537,980 B2* | 9/2013 | Frazier et al. | 379/88.11 |
| 8,554,831 B2* | 10/2013 | Santori et al. | 709/203 |
| 2002/0131565 A1* | 9/2002 | Scheuring et al. | 379/88.19 |
| 2005/0080606 A1 | 4/2005 | Ampunan et al. | |
| 2006/0155526 A1* | 7/2006 | Castillo et al. | 704/1 |
| 2007/0005368 A1* | 1/2007 | Chutorash et al. | 704/275 |
| 2007/0219686 A1* | 9/2007 | Plante | 701/35 |
| 2007/0280445 A1* | 12/2007 | Shkedi | 379/93.23 |
| 2008/0071544 A1* | 3/2008 | Beaufays et al. | 704/270.1 |
| 2008/0071882 A1 | 3/2008 | Hering et al. | |
| 2008/0140408 A1* | 6/2008 | Basir | 704/260 |
| 2008/0159491 A1* | 7/2008 | Kelley et al. | 379/88.16 |
| 2008/0319652 A1* | 12/2008 | Moshfeghi | 701/208 |
| 2009/0074168 A1* | 3/2009 | Henry | 379/201.12 |
| 2009/0134991 A1 | 5/2009 | Shuart | |
| 2009/0140855 A1* | 6/2009 | Shemesh et al. | 340/540 |
| 2009/0157615 A1* | 6/2009 | Ross et al. | 707/3 |
| 2009/0177476 A1* | 7/2009 | Darrell et al. | 704/275 |
| 2009/0267756 A1* | 10/2009 | Denny et al. | 340/521 |
| 2009/0271200 A1* | 10/2009 | Mishra et al. | 704/254 |
| 2009/0271380 A1 | 10/2009 | Julia et al. | |
| 2010/0063670 A1* | 3/2010 | Brzezinski et al. | 701/33 |
| 2010/0111071 A1* | 5/2010 | Khare | 370/352 |
| 2010/0312469 A1* | 12/2010 | Chen | 701/207 |

OTHER PUBLICATIONS

Patent application for U.S. Appl. No. 12/636,553, filed Dec. 11, 2009.
Patent application for U.S. Appl. No. 12/622,842, filed Nov. 20, 2009.
Martin, J., "From Speech to Text", PC World, Oct. 10, 2007; http://www.pcworld.com, pp. 1-5.

* cited by examiner

FIG. 1

January 2010

| Monday | Tuesday | Wednesday | Thursday | Friday | Sat/Sun |
|---|---|---|---|---|---|
| | | | | January 1, 2010 | 2 |
| | | | | | 3 |
| 4 | 5<br>Client A - 9am<br>Sales Meeting — 92 | 6 | 7<br>Client B - 9am<br>Sales Meeting<br>Client C - 10:30am<br>Sales Meeting — 92 | 8 | 9 |
| | | | | | 10 |
| 11 | 12 | 13 | 14 | 15 | 16 |
| | | | | | 17 |
| 18 | 19 | 20 | 21 | 22 | 23 |
| | | | | | 24 |
| 25 | 26 | 27 | 28 | 29 | 30 |
| | | | | | 31 |

| January 2010 | | | | | |
|---|---|---|---|---|---|
| Monday | Tuesday | Wednesday | Thursday | Friday | Sat/Sun |
| | | | | January 1, 2010 | 2 |
| | | | | | 3 |
| 4 | 5 | 6 | 7 | 8 | 9 |
| | | | | | 10 |
| 11 | 12 | 13 | 14 | 15 | 16 |
| | | | | | 17 |
| 18 | 19 | 20<br>24 Miles<br>Troy-Detroit<br>Business trip | 21 | 22 | 23 |
| | | | | | 24 |
| 25 | 26 | 27 | 28 | 29 | 30 |
| | | | | | 31 |

SYSTEM AND METHOD FOR UPDATING INFORMATION IN ELECTRONIC CALENDARS

CROSS-REFERENCE TO RELATED APPLICATION

This application is a continuation-in-part of U.S. patent application Ser. No. 12/636,553, filed on Dec. 11, 2009. This application claims the benefit of the aforementioned application and the content of the above application is incorporated herein by reference in its entirety.

TECHNICAL FIELD

The present disclosure relates generally to a system and method for updating information in electronic calendars.

BACKGROUND

Business owners and their employees often use electronic calendars to keep track of appointments and maintain current contact information. Such calendars may be local on a particular electronic device (e.g., a personal computer, laptop notebook, netbooks, etc.), and may be synched with other mobile devices (e.g., mobile phones, personal digital assistants (PDAs), etc.). The calendar information may be particularly useful for keeping schedules and maintaining organization.

SUMMARY

According to an aspect of the invention, there is provided a method of updating electronic calendar information. The method includes receiving from a user at a vehicle telematics unit (VTU), speech representative of information related to a particular vehicle trip, and recording the received speech in the VTU as a voice memo. The method also includes communicating data associated with the voice memo from the VTU to a computer running a calendaring application, associating the data with a field of the calendaring application, and storing the data in association with the calendaring application field.

According to another aspect of the invention, there is provided a vehicle telematics system including a microphone to receive speech from a user, wherein the speech is representative of information related to a particular vehicle trip, and a recorder to record the speech as a voice memo. The system also includes a vehicle telematics unit (VTU) in communication with the recorder to transmit data associated with the voice memo from the VTU, and a computer in communication with the VTU. The computer receives the data transmitted by the VTU, hosts a calendaring application that associates the data with a field of the calendaring application, and stores the data in association with the calendaring application field.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method and system disclosed herein advantageously enable a user to manage client and personal information. The system includes an electronic Gregorian calendar including contact entries that is linked to one or more vehicles of the user. A user may input a voice-tag memo to the vehicle, and ultimately the information associated with the voice-tag memo is uploaded to the calendar.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

Figure 1:
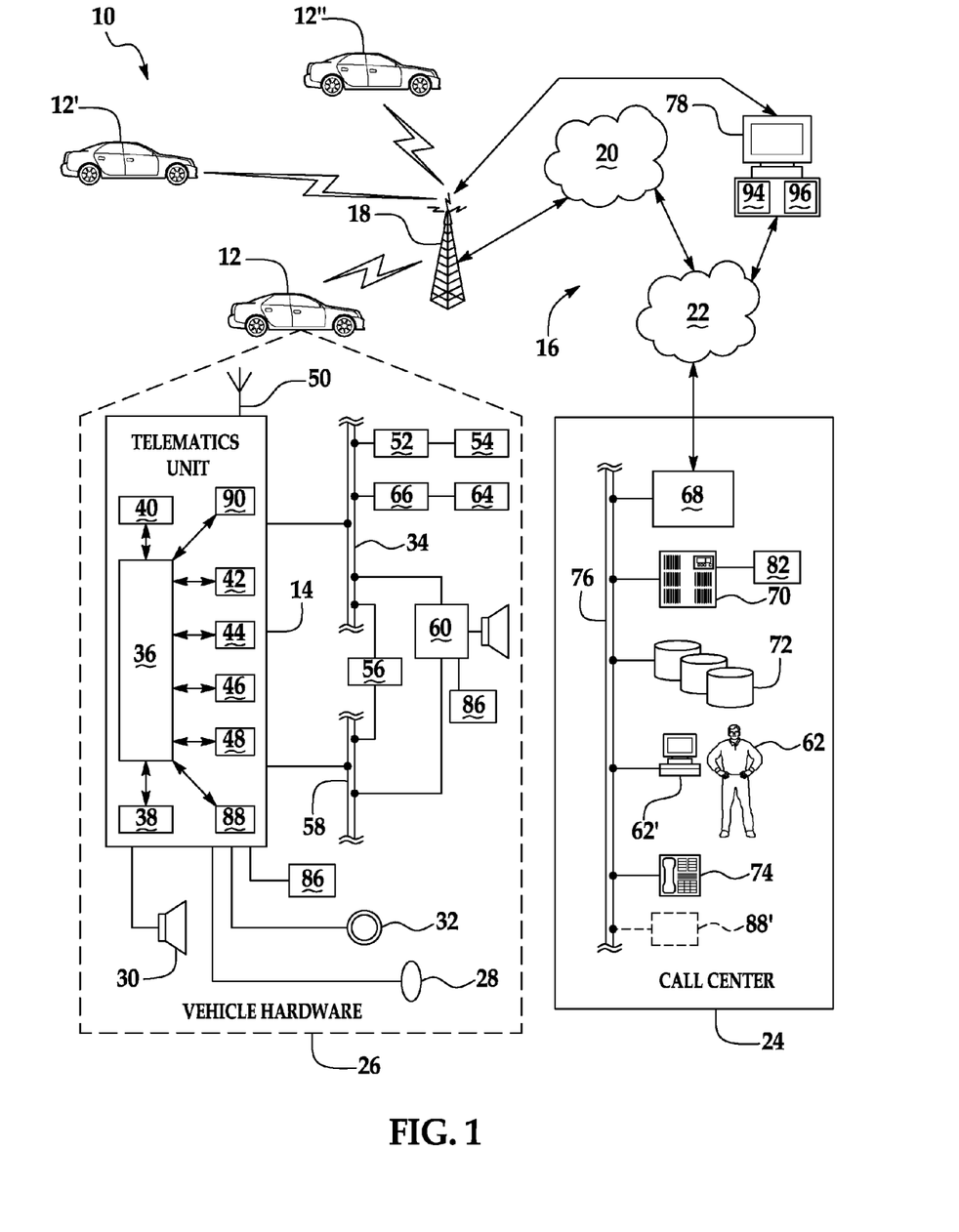
FIG. 1 is a schematic diagram of an example of the system for updating electronic calendar information.

Referring now to FIG. 1, the system 10 includes one or more vehicles 12, 12', 12" (each of which includes a telematics unit 14), a wireless carrier/communication system 16 (including, but not limited to, one or more cell towers 18, one or more base stations and/or mobile switching centers (MSCs) 20, one or more land networks 22, one or more service providers (not shown)), one or more call centers 24, and an Internet-enabled program 78. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicles 12, 12', 12" are mobile vehicles, such as a motorcycle, car, truck, recreational vehicle (RV), boat, plane, etc., and are equipped with suitable hardware and software that enables them to communicate (e.g., transmit and/or receive voice and data communications) over the wireless carrier/ communication system 16. It is to be understood that the vehicles 12, 12', 12" may also include additional components suitable for use in the telematics unit 14. The vehicles 12, 12', 12" may be individually owned, or may be owned by a business that uses a number of vehicles (i.e., a fleet) in operation in their ordinary course of business.

Some of the vehicle hardware 26 is shown generally in FIG. 1, including the telematics unit 14 and other components that are operatively connected to the telematics unit 14. While the vehicle hardware 26 is shown as being operatively disposed in vehicle 12, it is to be understood that each vehicle 12, 12', 12" has vehicle hardware 26 disposed therein as well. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), a dual antenna 50, a recorder 90, and, in some instances, a speech-to-text unit 88. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

In FIG. 1, the speech-to-text unit 88 is shown in the telematics unit 14. The speech-to-text unit 88 includes speech recognition software and is in operative communication with a recorder 90. In one example, when a user wishes to record a voice-tag memo in the vehicle 12, he/she presses an in-vehicle button to initiate the recorder 90. In response to an in-vehicle prompt that the recorder 90 is recording (e.g., an audible beep or a blinking light), the user speaks and the recorder 90 records such utterance(s). The recorded utterance is then transmitted to the speech-to-text unit 88, and the speech recognition software of the unit 88 is configured to convert the recorded utterance(s) into corresponding text.

In another example, the recorder 90 is a component of the telematics unit, and the speech-to-text unit 88' is located at the call center 24 (as shown in phantom in FIG. 1). In such instances, the user may activate the recorder 90 as previously described, and when recording is complete, the telematics unit may be configured to initiate communication with the call center 24 to transfer the recording to the off-board speech-to-text unit 88'. As described hereinbelow, a voice channel or packet data may be used to transmit the recorded data. Once the recording is transmitted to the speech-to-text unit 88', the speech recognition software converts the recorded utterance(s) into corresponding text. The storage and/or use of the generated text is discussed further hereinbelow in reference to the other figures.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications preferably use radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services. In still another example, one of the buttons 32 may be used to initiate the recorder 90.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. The audio component 60 may also include software for receiving alerts from other vehicles 12 using the method(s) disclosed herein.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, and/or the like. Non-limiting example sensor interface modules 66 include powertrain control, climate control, body control, and/or the like.

In a non-limiting example, the vehicle hardware 26 includes a display 86, which may be operatively connected to the telematics unit 14 directly, or may be part of the audio component 60. Non-limiting examples of the display 86 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22, and between the Internet-enabled program 78 and the land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 and Internet-enabled program 78 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70 and software 82 associated therewith, databases 72, live and/or automated advisors 62, 62', as well as a variety of other telecommunication and computer equipment 74 that is known to those skilled in the art. These various call center components are coupled to one another via a network connection or bus 76, such as the one (vehicle bus 34) previously described in connection with the vehicle hardware 26.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or an automated response system 62', and data transmissions are passed on to a modem (not shown) or other piece of equipment for demodulation and further signal processing. The modem preferably includes an encoder, as previously explained, and can be connected to various devices such as the server 70, database 72, and/or speech-to-text unit 88'. As shown, the server 70 may be associated with software 82, which supports the Internet-enabled program 78 that is accessible to subscribers via the Internet. The database 72 may be designed to store subscriber profile records, subscriber behavioral patterns, vehicle data, or any other pertinent subscriber information. As previously discussed, the off-board speech-to-text unit 88' may be located at the call center 24 and used to generate text from incoming voice-tag memos.

It is to be appreciated that the call center 24 may be any central or remote facility, manned or unmanned, mobile or fixed, to or from which it is desirable to exchange voice and data communications.

Furthermore, although a service provider (not shown) may be located at the call center 24, the call center 24 is a separate and distinct entity from the service provider. In an example, the service provider is located remote from the call center 24. A service provider provides the user with telephone and/or Internet services. In an example, the service provider is a wireless carrier (such as, for example, Verizon Wireless®, AT&T®, Sprint®, etc.). It is to be understood that the service provider may interact with the call center 24 to provide service(s) to the user.

The system 10 also includes the Internet-enabled program 78, which is in selective communication with the server 70 (and associated software 82) of the call center 24 (e.g., via wireless carrier/communication system 16 or some other suitable communication system). The Internet-enabled program 78 is supported and hosted by one or more servers (not shown) that are capable of communicating with the call center 24. The Internet-enabled program 78 includes an electronic calendar 94 that enables a user to store information related to appointments (e.g., appointment dates, times, locations, etc.), contacts (e.g., contact name, phone numbers, address(es), business information, personal information, etc.), or the like.

A user (e.g., an individual vehicle owner, a fleet manager and/or owner, or the like) signs up to utilize the Internet-enabled program 78. Upon registering, the user is given an initial password and login ID, both of which may be customized by the user after the initial registration process is complete. An account is set up for the user, which may include a name and/or company name associated with the account, a fleet account number, an executive or other person associated with the account, contact information, billing information, etc. The subscriber can enroll via one of several methods. As one method, the subscriber can enroll through a website associated with the Internet-enabled program 78, which may or may not be part of a more comprehensive vehicle services website. A second method for enrolling includes placing a voice call to a call center live advisor 62. The live advisor 62 has computer access to the subscriber's account information for the purpose of carrying out the enrollment.

The website of the Internet-enabled program 78 may include a homepage (not shown) including enrollment boxes, and login and ID boxes that enable a user to access his/her account. The homepage may also include convenient drop-down options for the user, for easy access to a plurality of reports (examples of which are described hereinbelow). The Internet-enabled program 78 is available 24 hours a day and 7 seven days a week, thus allowing a user flexibility in managing his/her calendar 94.

When a fleet owner signs up, he/she registers the vehicles 12, 12', 12" in the fleet (including vehicle ID, make and model, region in which vehicle is used, etc.), any other user's authorized to access the account (including their name, user ID, etc.), and/or designates any desirable parameters for the calendar 94 as a whole and/or for any particular vehicle 12, 12', 12" in the fleet. For example, the fleet owner may assign each member of his/her team a login and password so that he/she can access his/her individual calendar 94 without accessing other's calendars or general account information. Each individual user may then access their calendar 94 from one or more electronic devices (not shown).

The call center 24 may also be given access to the calendar (s) 94 once the user (e.g., an individual or a fleet manager) has i) subscribed for services associated with the call center 24 and ii) has agreed that the call center 24 may have such access. As an example, when a fleet manager signs up a plurality of vehicles 12, 12', 12" for telematics related services through the call center 24, each vehicle user in his fleet will have access to his/her own calendar 94 on the Internet-enabled program 78, and will be able to utilize one or more call centers 24 associated with such telematics related services. Furthermore, in this example, once the fleet account is set up with the call center 24, the fleet manager can enable the call center(s) 24 to transmit data to each electronic calendar 94 that is registered with the fleet manager's particular account.

Figure 2:
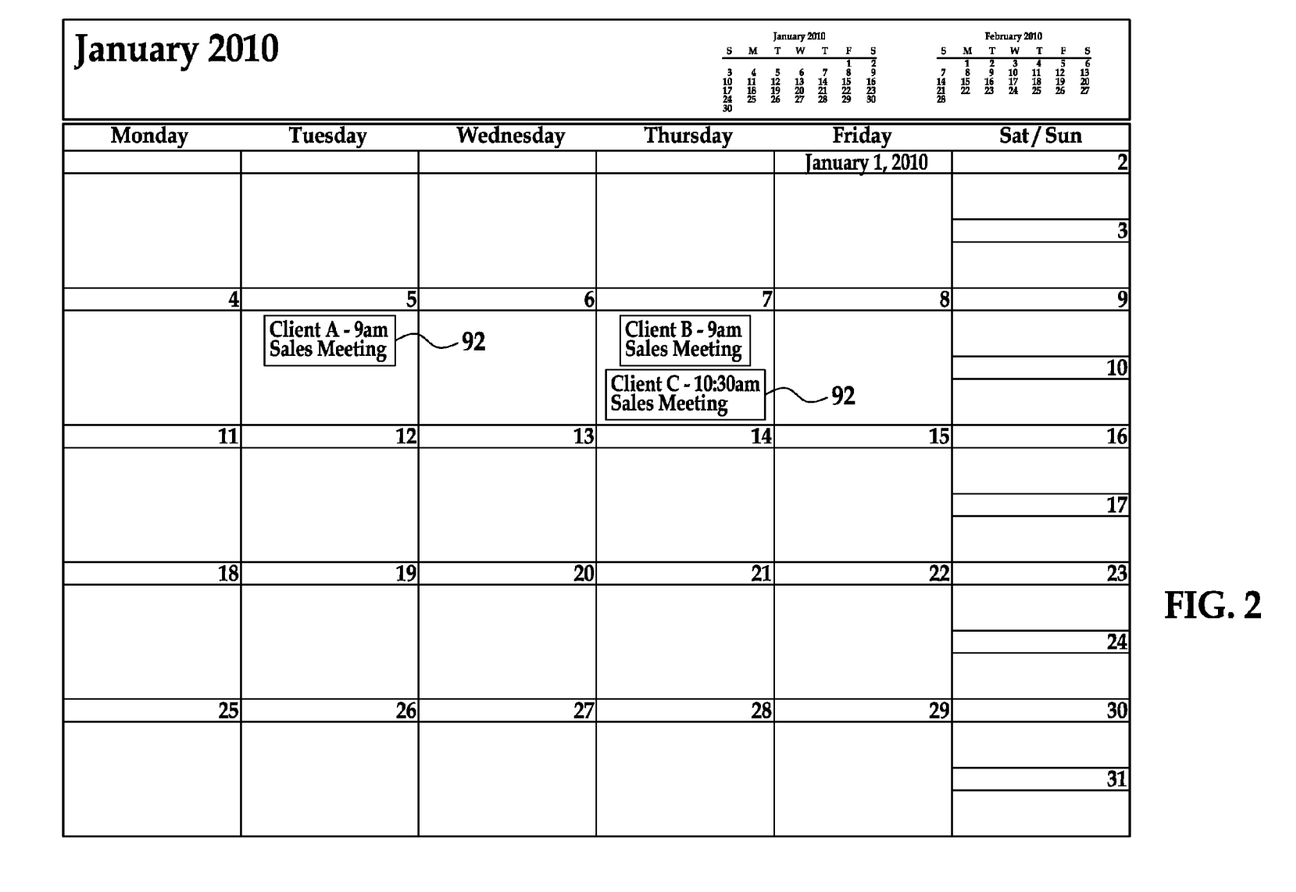
FIG. 2 is a schematic diagram of one month of the electronic calendar.
Figure 3:
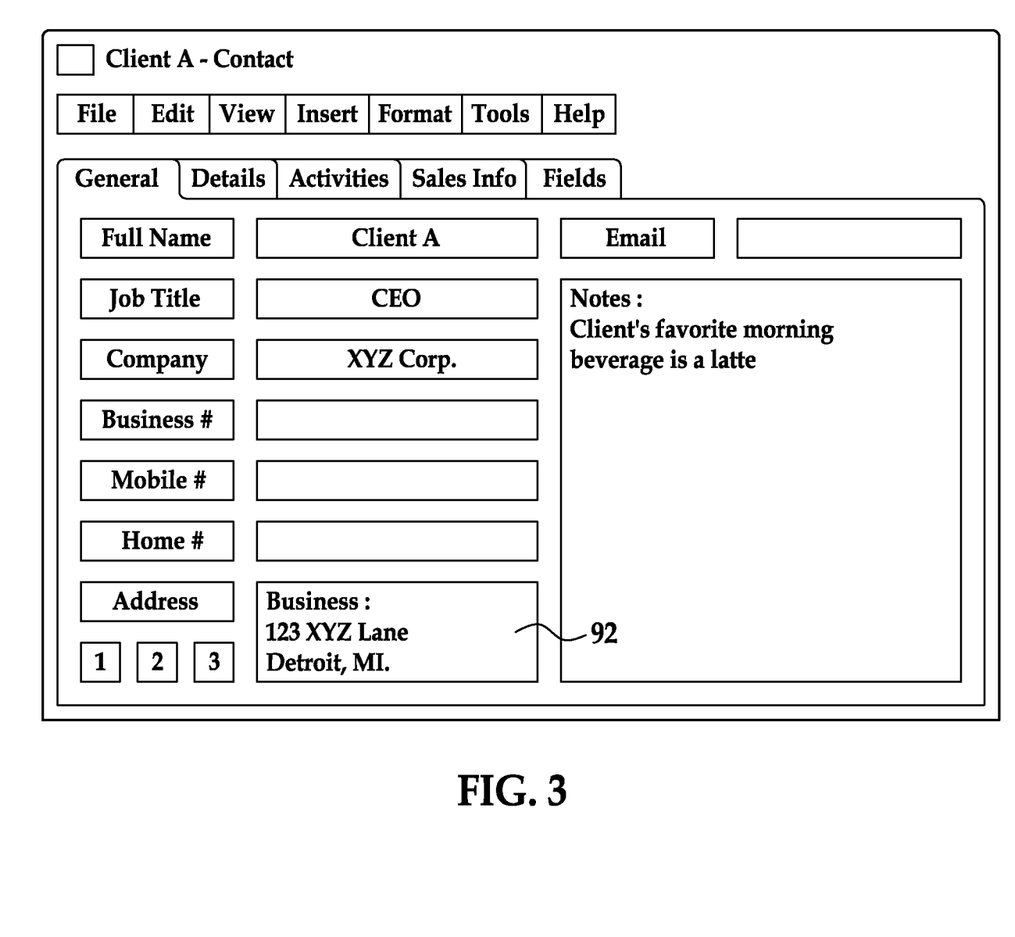
FIG. 3 is a schematic diagram of one contact entry of the electronic calendar.

As mentioned, each individual who has subscribed to the Internet-enabled program 78 has access to his/her online calendar 94. The calendar 94 may be used to keep track of appointments (e.g., personal appointment, sales calls, client meetings, etc.), and to maintain up-to-date contact information (e.g., personal and/or business contacts). Examples of a calendar page and a client contact page that are viewable via the Internet-enabled program 78 are shown in FIGS. 2 and 3, respectively. In FIGS. 2 and 3, client/potential client appointments and contact information have been logged into appropriate cells 92 of the calendar 94 via any computer or electronic device capable of supporting and running the Internet-enabled program 78. As depicted in FIG. 2, the appointments may be shown on a monthly basis. However, it is to be understood that yearly, weekly, and daily calendar pages may also be accessed/viewed. As depicted in FIG. 3, various forms of contact information may be stored, including personal and business phone numbers, addresses, etc. Both of these aspects of the calendar 94 will be further discussed in reference to FIG. 4. The data entered into the calendar 94 is stored in the database 72, for example, and is linked to the user's profile.

Figure 4:
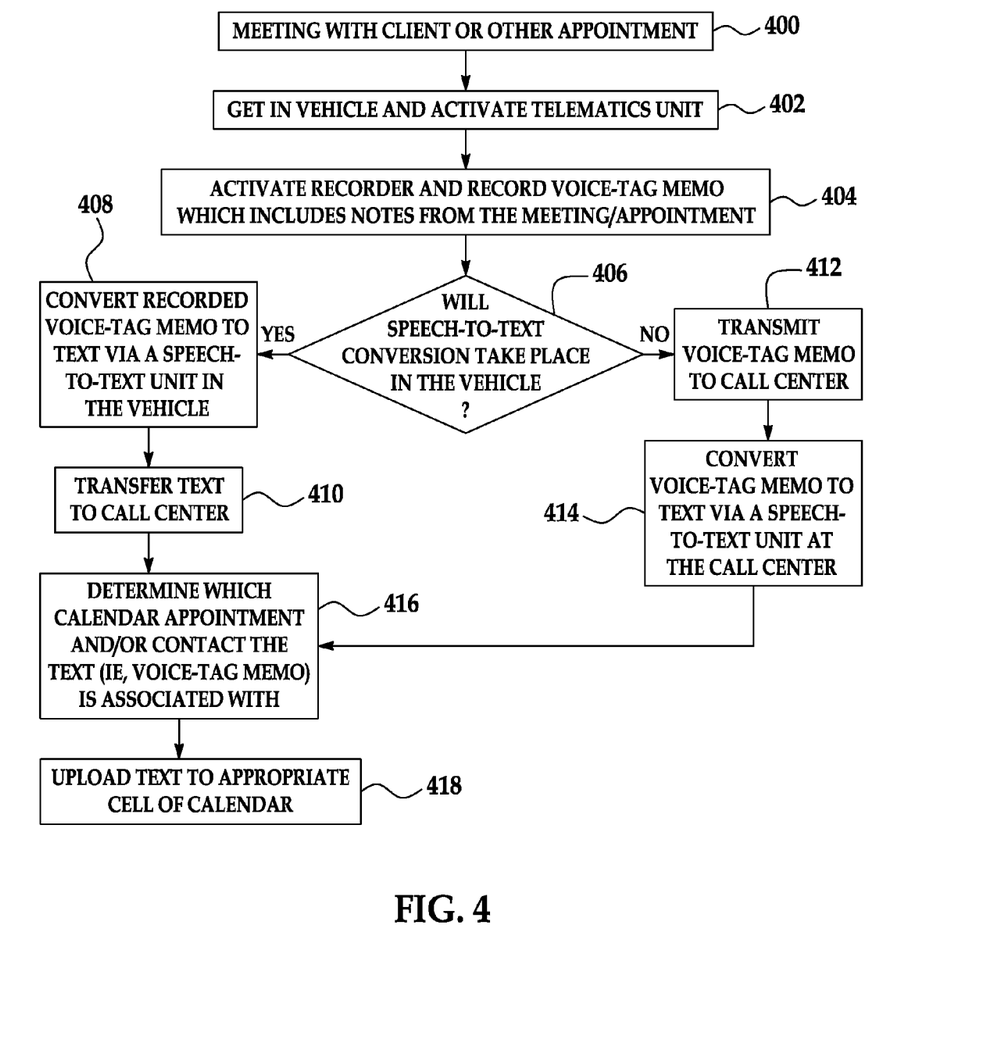
FIG. 4 is a flow diagram of examples of the method for updating electronic calendar information.

Referring now to FIG. 4, examples of the method for updating information in the electronic calendar 94 of the Internet-enabled program 78 are depicted. The method begins (see reference numeral 400) when the user meets with a client or other person, and such meeting is stored in the user's calendar 94.

However, it is to be understood that the calendar 94 may be used prior to the meeting shown at reference numeral 400. In one example, the calendar 94 may be accessed in order to assist the user in getting to the meeting or preparing for the meeting. Since the calendar 94 is accessible via the call center 24 and the vehicle 12 is in operative communication with the call center 24, the user can request, from the vehicle 12, a number of items related to the calendar entries. As one example, the user may request that the appointment data logged in for that particular day be retrieved and delivered to an in-vehicle display 86. As another example, the user may request that the client address be retrieved and directions to such address be generated (via the call center 24 or an on-board navigation system) and delivered via the in-vehicle display 86 or audio system 60. As still another example, the user may request to review particular personal information that is stored (e.g., in a contact entry of the calendar 94) about the person with whom he/she is meeting. When the user makes such a request, the advisor 62 or 62' is configured to retrieve the appropriate data from the database 72 and push such data to the vehicle 12.

Referring back to FIG. 4, as shown at reference numeral 402, once the meeting is finished and the user returns to the vehicle, he/she may begin an ignition ON cycle of the vehicle 12, or at least an ignition ON cycle of the telematics unit 14 (by activating the electronics, but not the engine). The user may wish to record a voice-tag memo about the meeting/appointment and/or about the person with which he/she met with. The information that the user may wish to record may include business details or notes, such as, e.g., sales information, products requested or of interest to the client, action items as a result of the meeting, or any other like information. The information may also include information about the person or people involved in the meeting, such as, e.g., new contact information (e.g., new phone number), personal information (e.g., spouses, kids or pets names; birthday; etc.), personal taste information (e.g., favorite coffee, favorite lunch place, dietary needs, etc.), or any other like information.

In order to record such a memo, the in-vehicle user activates the push button 32 that initiates the recorder 90. Once the recorder 90 is ready, the telematics unit 14 transmits a signal within the vehicle 12 that lets the user know to begin speaking. The user then iterates the utterances in the vehicle 12, which are amplified by the microphone 28 and recorded by the recorder 90.

When the recording is complete, the telematics unit 14 determines whether the recorded speech will be converted into text in the vehicle 12 or at the call center 24 (as shown at reference numeral 406). When the telematics unit 14 has the speech-to-text unit 88 therein (i.e., the unit 88 is on-board), the unit 14 is configured to automatically transmit the recording to the in-vehicle speech-to-text unit 88. The unit 88 then utilizes the speech recognition software to generate text that corresponds to the voice tag memo (as shown at reference numeral 408). In one example, the input speech is digitized and broken into phonemes, which are matched with representative phonemes in a dictionary or lexicon that correspond to one or more words. Any known speech-to-text technology may be utilized. In this system 10, utterances are received by the microphone 28 and recorded via recorder 90. The text-to-speech unit 88, 88' digitizes the recorded utterances and contains hardware (e.g., a microprocessor and memory) and software to perform the conversion. It is to be understood that in another example, the text-to-speech conversion is performed by the main processor in the telematics unit 14. Generally, the lexicon or dictionary is contained within the memory associated with the text-to-speech unit 88, 88'. The digitized utterances, typically parsed into representative phonemes, are compared with phonemes associated with words in the lexicon or dictionary. The phoneme or set of phonemes representing a word in the lexicon or dictionary that most closely matches the digitized phonemes representing the utterance is utilized. The word in the lexicon or dictionary is represented as text and is human understandable. Once generated, the text is then transferred to the call center 24, as shown at reference numeral 410.

However, when the speech-to-text unit 88' is an off-board device (e.g., located at the call center 24), the telematics unit 14 transmits the recording to the call center 24 over a voice channel or as packet data, as shown at reference numeral 412. The uploading of the recording takes place during a vehicle data upload event. The vehicle data upload event takes place at some predetermined interval (e.g., all stored vehicle data is uploaded to the call center 24 every 20 minutes) or in response to some trigger (e.g., once the telematics unit 14 recognizes that the recording is complete). The telematics unit 14 may include a vehicle data upload (VDU) system (not shown), which is configured to receive raw vehicle data or recordings from the bus 34, packetize the data, and upload the packetized raw data to the call center 24 (or other external entity). The VDU is operatively connected to the processor 36 of the telematics unit 14, and thus is in communication with the call center 24 via the bus 34 and the wireless communication system 16. The VDU may be the telematics unit's central data system that can include a modem, a processor, and an on-board database. The database can be implemented using a separate network attached storage (NAS) device or be located elsewhere, such as in memory 38, as desired. The VDU system has an application program that handles all of the vehicle data upload processing, including communication with the call center 24 and the setting and processing of triggers.

The call center switch 68 is configured to recognize the data transmission and route the incoming text to the speech-to-text unit 88'. Similar to the on-board unit 88, the off-board unit 88' utilizes internal speech recognition hardware and software to generate text that corresponds to the voice-tag memo (as shown at reference numeral 414).

Regardless of where the speech-to-text conversion takes place, after such conversion, a calendar comparator 96 of the Internet-enabled program 78 receives the text from the call center 24 and compares the information therein to information previously recorded in the electronic calendar 94 and stored in the database 72. The calendar comparator 96 is software of the Internet-enabled program 78 that is configured to identify which profile and calendar 94 to search by identifying the vehicle 12, 12', 12" which generated the voice-tag memo (and in some instances, which generated the corresponding text). When the transmission of the recording or text takes place, the vehicle 12, 12', 12" making such transmission is identified at the call center 24 via the mobile dialing number (MDN) associated with the vehicle 12, 12', 12". Any profile and calendar 94 associated with the calling vehicle 12, 12', 12" may be used for comparison purposes. In one example, the vehicle 12, 12', 12" will be associated with the user. In another example, such as a fleet situation, the calendar comparator 96 will cross-check the identified vehicle 12, 12', 12" with a then-current user (e.g., who is assigned to that vehicle 12, 12', 12" that particular day) because the day-to-day user may be different. Such cross-checking may be accomplished by checking an electronic list present on the Internet-enabled program 78 that has a log of which driver has which vehicle 12, 12', 12" at a particular time.

During the comparison, the calendar comparator 96 may compare a time and date stamp of the voice-tag memo with all appointments logged into the electronic calendar 94. For example, if a voice-memo and the corresponding text has a time and date stamp of 10:30 am, Jan. 5, 2010, the system may retrieve the appointment with Client A as a possible cell 92 for adding the text thereto (see, e.g., FIG. 2). In most instances, the calendar comparator 96 will also compare the content of the text with data pre-recorded in the calendar 94 to determine which appointment and/or contact entry the text is associated with. Using the previous example, if the text generated from the voice-tag memo also includes a person's name (e.g., Client A), the calendar comparator 96 may retrieve any appointments with Client A on or within a predetermined number of days of January $5^{th}$, and may also retrieve the contact entry for Client A (see FIG. 3).

Once calendar appointments and/or contact entries are identified as being associated with the text, the calendar comparator 96 determines which cells 92 or fields of the calendar 94 the text should be uploaded to. Each column and row in the calendar 94 has a date and time association, and such data may be used to identify the appropriate cells 92. A date and time stamp of the recording may be retrieved in a number of ways including, for example, the RTC 46 in the telematics unit 14 providing a time and date stamp that is accessed and provided to the converted speech file (i.e., the text), the GPS receiver 44 in the telematics unit 14 providing a time and date stamp that is accessed and provided to the converted speech file, or the cellular chip set 40 in the telematics unit 14 providing a time and date stamp that is accessed and provided to the converted speech file. In one example, the recording time and date is represented as text in a header portion of the converted speech file. The calendar comparator 96 extracts the time and date stamp of the recording and correlates it with a calendar row and column. Correlation is initially performed by matching times and dates. In some instances, correlation is also performed by matching other data (e.g., client name, sales information, updated contact info, spouse information, miscellaneous personal information, etc.) that may be extracted from the uploaded file. For example, if the user utters, "I just met with John Doe and XYZ corporation," both "John Doe" and "XYZ corporation" may be extracted from the uploaded text file and correlated to text within the calendar 94. Generally, key words and phrase extraction, along with time and date stamps may be utilized to identify appropriate cells 92 for data upload. As another example, key phrases such as "change appointment" or "cancel appointment" may be indexed into software components of the calendar comparator 96 to subsequently perform these tasks when such phrases are identified in the analyzed text. The following are various examples of the uploading of the text data.

In one example, if the text states, "Jan. 5 appointment with Client A cancelled, rescheduled for Jan. 15, 2010, 10 am", the calendar comparator 96 may utilize the dates and the client name to determine that the text is associated with the information in the cell 92 of the Jan. 5, 2010 calendar (shown in FIG. 2), and can upload the text to that appointment. In some instances, the calendar comparator 96 may be configured to input the cancellation notice in the cell 92 on Jan. 5, 2010, and incorporate the new appointment information in a cell 92 associated with Jan. 15, 2010.

In still another example, if the text states, "Client A prefers lattes and his new wife's name is Jane", the system may utilize the client's name to query the electronic calendar 94 to determine which contact entry should be opened. Once Client A's entry is identified, the system may determine which cells 92 should receive the information from the text. Which cells 92 are identified may depend on the format of the client entry. As shown in FIG. 3, the field of "notes" in the general tab of the client entry may be used to enter the information about Client A's favorite morning beverage. Furthermore, the details tab of the client entry may include "family information" or "spouse's name" for entry of Client A's wife's name.

If the system cannot determine an appropriate cell (e.g., there is no specific cell 92 for the client's favorite coffee), the system will simply upload the text to a notes or miscellaneous information cell (see FIG. 3), and the user can organize such information the next time he/she logs into his/her calendar 94.

Alternately, once the text is generated, the calendar comparator 96 may simply identify the calendar 94 with which the text is associated (by associating the vehicle 12 from which the voice-tag memo was generated with a profile at the call center 24 and calendar 94 of the Internet-enabled program 78), and just upload all of the text to the notes or miscellaneous information cell 92. This may be a setting that the user can select for his/her calendar 94, for example, if he/she wants the information to be available in the calendar 94 via the voice-tag memo method, but if he/she wants to be the one organizing such information into the more specific cells 92 of the calendar 94.

The user may also be provided with an update the next time he/she logs into his/her calendar 94, which informs the user where the text information has been added. This may be in the form of a list, or newly added text may appear in a pre-set or default color or font which distinguishes the newly added text from previously added and stored information. This feature allows the user to verify that his/her voice-tag memo has been added to the calendar 94 and that the information of the voice-tag memo has been entered into a desirable cell/field 92.

The updated calendar information may be retrieved at any desirable time by logging into the Internet-enabled program 78 or from within the vehicle 12, 12', 12" (e.g., when the user is on route to another appointment). In one example, the user may be on his/her way to a follow up appointment with Client A, may access Client A's updated information from within the vehicle 12, 12' 12", and may stop to get Client A a latte after being reminded that this is Client A's favorite drink.

Since the information that is input is tailored to a specific contact and/or appointment, such information may be used to track, for example, sales information for a particular client, to follow up with the contact regarding a particular product or service discussed during a meeting, and/or to simply maintain a good relationship with a client (e.g., by purchasing his/her favorite beverage, remembering his/her birthday, etc.).

Furthermore, while the example discussed in reference to FIG. 4 involves a user who records a voice-tag memo after attending a meeting that was scheduled on his/her electronic calendar 94, it is to be understood that a voice-tag memo may be recorded at any time the user is in the vehicle 12, 12', 12". The process for generating corresponding text, analyzing the corresponding text, and associating such text with a calendar appointment and/or contact entry may be performed as described herein. For example, a user may run into a friend at a restaurant and be informed that the friend's address has changed. Upon entering his/her vehicle 12, 12', 12", the user may record a voice-tag memo identifying the friend and his/her new address. The voice-tag memo will be converted to text, and the method will be performed to add or update the friend's information in the user's electronic calendar 94. If an entry in the calendar is not found to be suitable for uploading the text, the Internet-enabled program 78 may store the information until the next user log-in period. At this log-in period, the user may be informed that the information has not been added to the calendar 94 and may be prompted to insert the information in an existing entry, create a new entry, and/or delete the information.

The methods disclosed herein enable on-the-spot recording of notes and other information from meetings, appointments, etc. from within the vehicle 12, 12', 12", and automatically filling of such information into the user's calendar. This system and method shorten the window for capturing such information, thereby reducing the possibility that such information is forgotten or lost.

Figure 5:
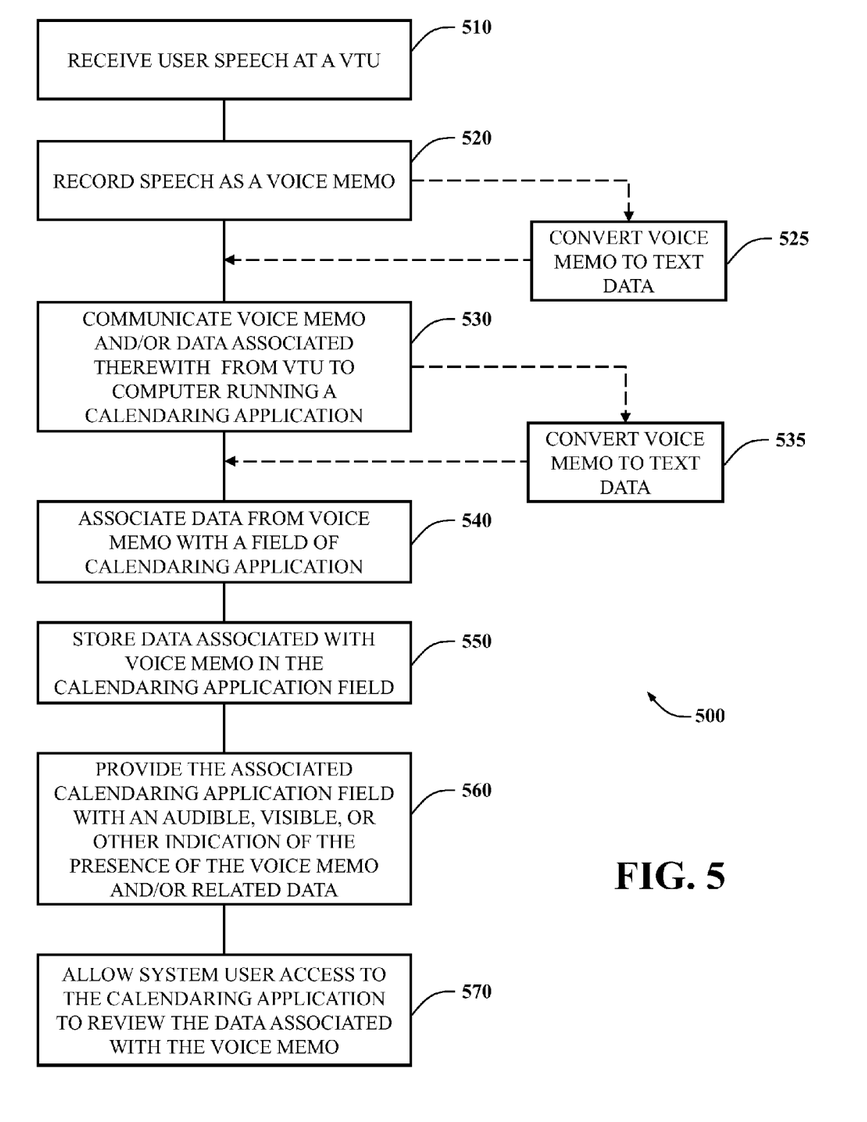
FIG. 5 is another flow diagram of an example of a method of updating electronic calendar information.

FIG. 5 illustrates a flow chart of another exemplary embodiment of a method of updating electronic calendar information from voice memos recorded at a vehicle telematics unit (500). This embodiment is similar in many respects to the embodiments of FIGS. 1-4 and like numerals between the embodiments generally designate like or corresponding elements throughout the several views of the drawing figures. Additionally, the descriptions of the embodiments are incorporated by reference into one another and the common subject matter generally may not be repeated here.

By way of background, a driver of a vehicle sometimes needs to recall information specific to trips taken in the vehicle. For example, after the driver has taken several trips, the driver may wish to differentiate between trips taken for business and those taken for pleasure. But the driver may forget the nature of a particular trip or related details of that trip, especially if numerous trips have been taken and/or significant time has passed since that trip. Moreover, the driver may not be able or willing to write or otherwise hand record details of any given trip, especially if the vehicle is in motion.

Therefore, and turning now to FIG. 5, there is shown a flow chart of the method 500, which can be carried out within the operating environment of the vehicle telematics system 10 as well as using suitable hardware and programming of the other components shown in FIG. 1. These features of any particular implementation will be known to those skilled in the art based on the above system description and the discussion of the method described below in conjunction with the remaining figures. Those skilled in the art will also recognize that the method can be carried out using other systems within other operating environments.

At step 510, speech is received from a user at a vehicle telematics unit (VTU), wherein the speech is representative of information related to a particular vehicle trip. For example, the speech may be received by the microphone 28 of the VTU 14 shown in FIG. 1. In another example, the information may be related to a meeting, event, or the like at a destination of the particular vehicle trip, wherein the speech may be received at the beginning of or during the trip, upon arrival to the destination, upon leaving the destination after the trip, en route from the destination, or the like. Conversely, the information may be related to a meeting, event, or the like at an origin of the particular vehicle trip, wherein the speech may be received upon leaving the origin, or en route from the origin during the trip, upon arrival to the destination, or the like. Also, the information may include an indication of the nature of the particular vehicle trip including at least one of business, personal, charitable, or the like. In another example, the information may include an indication of an attribute of the particular vehicle trip including at least one of a personal contact, a business contact, an appointment topic, an event topic, meeting information, sales information, product information, personal information, or the like.

At step 520, the speech received in step 510 is recorded in a VTU as a voice memo. For example, the recorder 90 of the VTU 14 of FIG. 1 may be used to receive speech signals from the microphone 28 and/or any suitable device(s) therebetween. The voice memo may be stored as an audio file in any suitable memory such as the VTU memory 38 shown in FIG. 1 and in any suitable audio file format. The audio file may be generated in any suitable manner, and may be associated with any suitable log file or the like that may be automatically generated with the audio file. Also, the audio file may include any suitable header data, which may include a horologic parameter or identifier like a date/time stamp, or any other suitable identifying data for the voice memo.

At step 525, the voice memo may be converted to text data, for example, via any suitable speech-to-text conversion. For instance, the speech-to-text converter or unit 88 of FIG. 1 may be in operative communication with the VTU 14 to convert the audio file into a speech-to-text data file. The speech-to-text data file may be associated with the audio file in any suitable manner and stored in the VTU memory 38 or the like.

At step 530, the voice memo and/or data associated with the voice memo is communicated from the VTU to a computer running a calendaring application. This can include sending the voice memo audio file that was originally recorded from the user, the converted text of that voice memo, the associated additional data (date, time, user or vehicle information, etc.), or any combination of these. The computer running the calendaring application may be the call center server 72, a computer or server running the Internet-enabled program 78, or any other suitable computer in communication with the system 10.

The calendaring application can be any suitable application software having calendaring functionality, like any suitable personal information manager (PIM) application software or the like. Example PIM application software may include Microsoft™ Outlook™, Lotus Notes™, Google™ Calendar, Yahoo!™ Calendar, or any other suitable product. In one embodiment, the calendaring application may be hosted by a call center of a telematics system or by a web server of the telematics system. In another embodiment, the calendaring application may be a third party application that is in direct communication with the user's account at the call center 24 of the telematics system 10 or that is synchronized with a calendaring application of the telematics system 10, or the like.

The data associated with the voice memo may include the audio file itself, header data in the audio file, a log file or the like associated in any suitable manner with the audio file, a speech-to-text data file or the like created from the recorded voice memo of step 520, or any other suitable data that may be associated with received and/or recorded speech. In one example, the data may include content that was spoken by the user like a personal contact, a business contact, an appointment topic, an event topic, meeting information, sales information, product information, or personal information. In another example, the data may include identifying data like horologic data such as a date and/or time stamp, a vehicle identification number (VIN), telematics system user identification, or the like. In a further example, the data may include vehicle trip data like trip origin and/or destination, trip mileage, or any other suitable trip data. Those of ordinary skill in the art will recognize that the VTU can be programmed to extract suitable horologic data, VIN data, user ID, origin/destination data via GPS or the like, trip mileage from an odometer or the like, and append it to or otherwise associate it with the voice memo for upload from the vehicle.

The data may be communicated from the VTU in any suitable manner. For example, the VTU 14 may transmit the voice memo to the call center 24 and/or to a Internet-enabled program 78 or web server or the like. The voice memo may be transmitted over a voice channel, over a packet data connection, or using any other suitable format and protocol. The transmission may take place at any time, for example, manually upon request of a system user, or automatically during a vehicle data upload event. In the automatic embodiment, the vehicle data upload event may occur at some predetermined interval, in response to some trigger, like an ignition-off signal or upon completion of the recording of the voice memo, or the like.

At step 535, a voice memo that has already been transmitted from the VTU and thereafter may be converted to a text data file. For example, the audio file of the voice memo may be received at the call center and converted to a text data file by the speech-to-text unit 88'.

At step 540, the data associated with the voice memo is associated with a field of the calendaring application in any suitable manner. For example, this step may be carried out based on at least one horologic parameter. More specifically, the calendaring application may identify horologic data that is present in a header of the audio file or that is otherwise associated with the voice memo, and then the calendaring application may associate the voice memo, and/or data associated with the voice memo, with a corresponding horologic field of the calendaring application. For instance, the calendaring application can read a voice memo recording date of Sep. 1, 2010 and recording time of 11:00 AM and associate the voice memo with a corresponding date and/or time field of the calendaring application.

In another example, step 540 may be carried out based on comparing content of the voice memo with content of other data stored in association with the calendaring application. More specifically, the calendaring application may read content in text data of a speech-to-text data file generated from the voice memo and cross-reference the content to any of a number of related fields. For instance, the voice memo content may include a contact name that may be cross-referenced with an instance of that name that happens to be already stored in association with a contact field (e.g. in FIG. 3) of the calendaring application.

At step 550, the data associated with the voice memo is stored in association with the calendaring application field. For example, the data may be stored in a calendar cell of the calendaring application, or may be stored in another memory location of the computer running the calendaring application and then cross-referenced to the calendaring application field.

Figure 6:
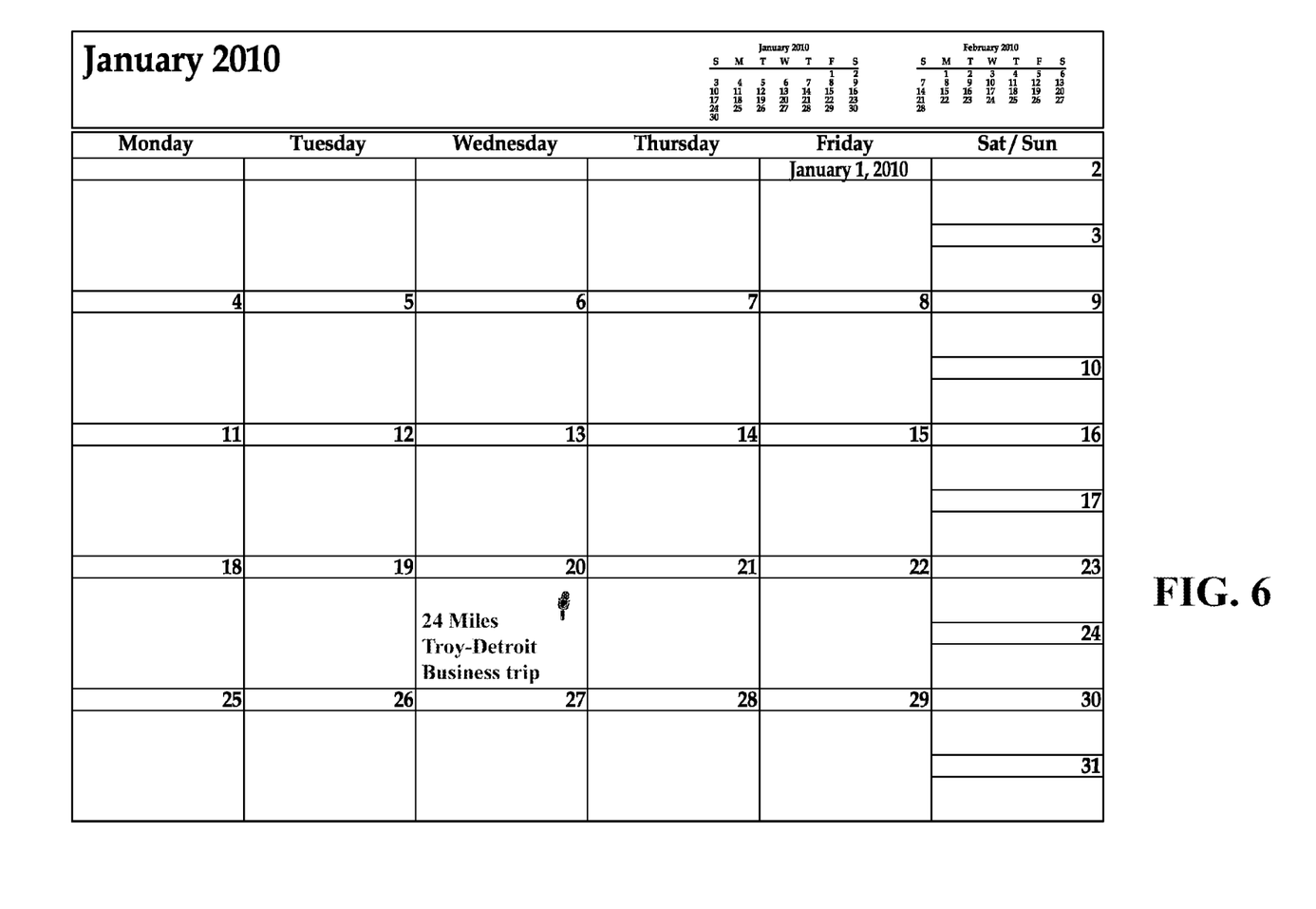
FIG. 6 is a schematic diagram of an example of another month of the electronic calendar.

At step 560, the associated calendaring application field may be provided with an audible, visible, or other indication of the presence of the voice memo and/or related data. For example, and with reference to FIG. 6, the calendaring application can be programmed in any suitable manner to display a graphical icon or the like in a field associated with the voice memo. More specifically, a particular displayed date (e.g. Jan. 20, 2010) in a displayed calendar (e.g. January 2010) can include a display of a microphone or speaker icon as a visible indication that a voice memo or related data is associated with that date. The icon may be linked in any suitable manner to the voice memo audio file. In another example, the calendaring application can be programmed in any suitable manner to display data associated with the voice memo. For instance, the displayed data may include trip data, for instance, trip mileage (e.g. 24 miles), origin/destination (e.g. Troy-Detroit), nature of the trip (e.g. Business trip), and/or the like. In a further example, the field associated with the voice memo may be displayed in a particular color. More specifically, a particular displayed time slot in a displayed calendar can be colored red to indicate that a voice memo or related data is associated with that time slot.

At step 570, a system user may access the calendaring application in any suitable manner to review the data associated with the voice memo. For example, the system user may access the calendaring application, see voice memo data or a voice memo indicator in a date and/or time field of a calendar, and either review the displayed data or select the indicator to view or hear further information associated with the indicator. More specifically, the user may use a computer pointing device like a mouse to point and click on the indicator and thereby automatically launch any suitable audio program configured to play the audio file for listening by the user.

The method(s) may be performed as one or more computer programs executable by one or more computing devices of or in communication with a vehicle telematics system to cause the system and/or the computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of updating electronic calendar information, comprising the steps of:

providing at least one server that is remotely located with respect to a vehicle having a vehicle telematics unit (VTU), the at least one server being in communication with a vehicle call center equipped to provide back-end services to the vehicle, wherein the at least one server stores instructions for an internet-enabled calendaring application comprising a plurality of electronic calendars, each electronic calendar having data fields associated with one or more of: user appointments, user contacts, user business information, and user personal information;

receiving at the VTU, from a first user located in the vehicle, speech representative of information related to a particular vehicle trip, wherein the first user is a subscriber to the internet-enabled calendaring application having access to a first electronic calendar;

recording the received speech in the VTU as a voice memo;

converting the voice memo to converted-text data using speech recognition, wherein the converting step occurs at the vehicle prior to the transmitting step or at the call center after the transmitting step; and transmitting one of with the voice memo or the converted-text data from the VTU using cellular communication to the at least one server;

associating without human interaction the converted-text data with one or more data fields in the first electronic calendar, wherein the associating step includes:

identifying which of the one or more data fields to modify based at least partially on: (a) a time and date stamp of the voice memo; and (b) the converted-text data; based on the identifying step, determining which of the one or more data fields of the first electronic calendar should be updated;

storing the converted-text data in at least one of the one or more data fields; and providing internet access to the first electronic calendar to a second user, wherein the second user also has internet access to other electronic calendars associated with different users.

2. A method as defined in claim 1, further comprising: providing an indication of the presence of the converted-text data in the calendaring application field of the first electronic calendar.

3. A method as defined in claim 2, wherein the indication includes a visible indicator.

4. A method as defined in claim 3, wherein the calendaring application data field is a calendar date and the visible indicator is a graphical icon displayed in the calendar date field and linked to an audio file associated with the voice memo.

5. A method as defined in claim 1, wherein the association of the converted-text data with the data field of the first electronic calendar is carried out based on at least one horologic parameter associated with the recording step.

6. A method as defined in claim 5, wherein the calendaring application identifies a date associated with the voice memo, and then associates the date with a corresponding date field of the first electronic calendar.

7. A method as defined in claim 1, wherein the information includes an indication of whether the particular vehicle trip was a business or personal vehicle trip.

8. A method as defined in claim 1, wherein the information includes an indication of an attribute of the particular vehicle trip including at least one of a personal contact, a business contact, an appointment topic, an event topic, meeting information, sales information, product information, or personal information.

9. A method as defined in claim 1, further comprising the step of converting the voice memo to converted-text data via a speech-to-text unit in operative communication with the in-vehicle telematics unit, wherein the converted-text data is transmitted a vehicle data upload.

10. A method as defined in claim 1, wherein the data includes at least one of an audio file of the voice memo, header data in an audio file of the voice memo, a log file associated with an audio file, a speech-to-text data file created from the voice memo.

11. A method as defined in claim 1, wherein the association of the converted-text data with the data field of the first electronic calendar is carried out by comparing content of the voice memo with content of data stored in association with the first electronic calendar.

12. A method as defined in claim 11, wherein the content includes a contact name in the voice memo with a name stored in a contact field in the first electronic calendar.

13. A non-transitory computer-readable medium comprising instructions executable by a vehicle telematics system to cause the system to perform a method according to claim 1.

14. A vehicle telematics system comprising:
a microphone in a vehicle to receive user speech representative of information related to a particular vehicle trip;
a recorder in the vehicle to record the user speech as a voice memo;
a telematics unit (VTU) in the vehicle in communication with the recorder to transmit data associated with the voice memo from the VTU; and
a computer server remotely located from the vehicle in cellular communication with the VTU configured to receive the transmitted data from the VTU; and
at least one of a vehicle speech-to-text converter in selective communication with the VTU to convert the voice memo to converted-text data or a call center speech-to-text converter in selective communication with the VTU to convert the voice memo to converted-text data, wherein the transmitted data includes the voice memo, the converted-text data, or both,
wherein the computer server hosts a calendaring application that comprises a plurality of electronic calendars which are associated with different vehicle users one of the plurality of electronic calendars being a first electronic calendar associated with the telematics unit and a first user thereof, wherein the calendaring application performs the following steps:
receiving the voice memo, the converted-text data, or both;
if the voice memo was not previously converted to text data by the vehicle speech-to-text converter, converting the voice memo to converted-text data using the call center speech-to-text converter; and
associating without human interaction the converted-text data with one or more data fields in the first electronic calendar, wherein the associating step includes:
identifying which of the one or more data fields to modify based at least partially on: (a) a time and date stamp of the voice memo; and (b) the converted-text data;
based on the identifying step, determining which of the one or more data fields of the first electronic calendar should be updated; and
storing the converted-text data in at least one of the one or more data fields; and
providing internet access to the first electronic calendar to a second user, wherein the second user also has internet access to other electronic calendars associated with different users.

15. A method of updating electronic calendar information, comprising the steps of:
(a) performing steps (a1)-(a6) for a first user of a first fleet vehicle:
(a1) receiving, from a user at a vehicle telematics unit (VTU), speech representative of information related to a particular vehicle trip;
(a2) recording the received speech at the VTU as voice memo data;
(a3) converting the voice memo data to converted-text data using speech recognition, wherein the converting step occurs at the vehicle prior to the step (a4) or at a computer server after the step (a4);
(a4) receiving via cellular communication the voice memo data, the converted-text data, or both and at least one identifier associated with the first user at a computer server running a calendaring application remotely-located from the VTU;
(a5) automatically associating at the computer server the voice memo data, the converted-text data, or both with a field of the calendaring application, wherein the automatically associating step comprises:
identifying which of one or more data fields in a first electronic calendar associated with the first user to modify based at least partially on: (a) a time and date stamp of the voice memo; and (b) the converted-text data, wherein the one or more data fields include: user appointments, user contacts, user business information, and user personal information; and
based on the identifying step, determining which of the one or more data fields of the first electronic calendar should be updated; and
(a6) storing at the computer server the converted-text data in association with the calendaring application field; and
(b) repeating step (a) for additional users of the first fleet vehicle and other fleet vehicles, wherein each of the additional users have at least one different identifier.

16. The method of claim 1, further comprising receiving at the call center an indication from the second user that the first user and the other, different users may receive information from the call center on their respective electronic calendars.

17. The method of claim 16, wherein the second user is a fleet manager, wherein the first user and the other, different users are fleet users.

18. The method of claim 1, further comprising: providing to the first user and the other, different users access to their respective electronic calendars, wherein the access is via a computer or electronic device capable of supporting and running the internet-enabled calendaring application.

\* \* \* \* \*